S. R. Nye.
Horse Rake.
Nº 53,172. Patented Mar. 13, 1866.
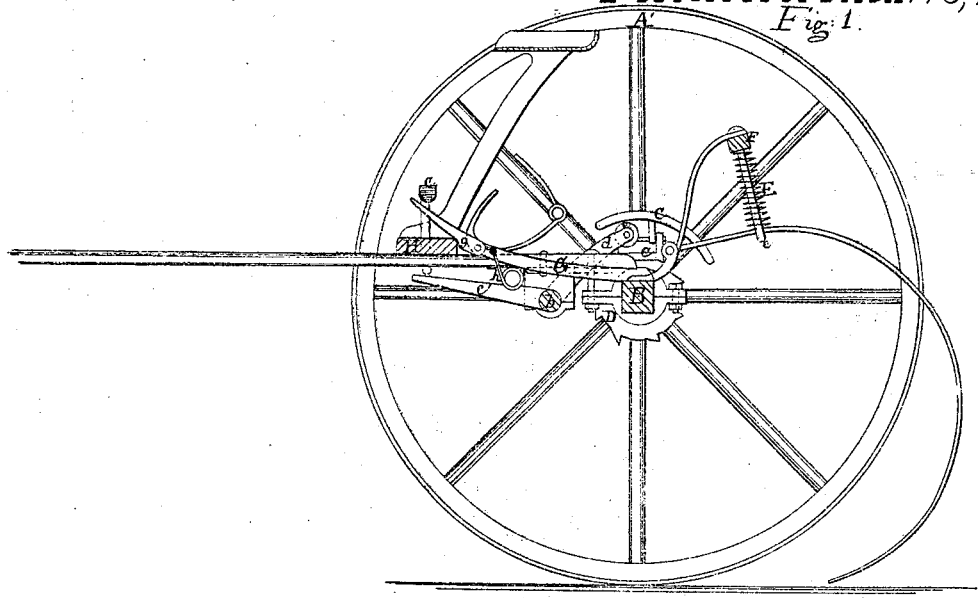
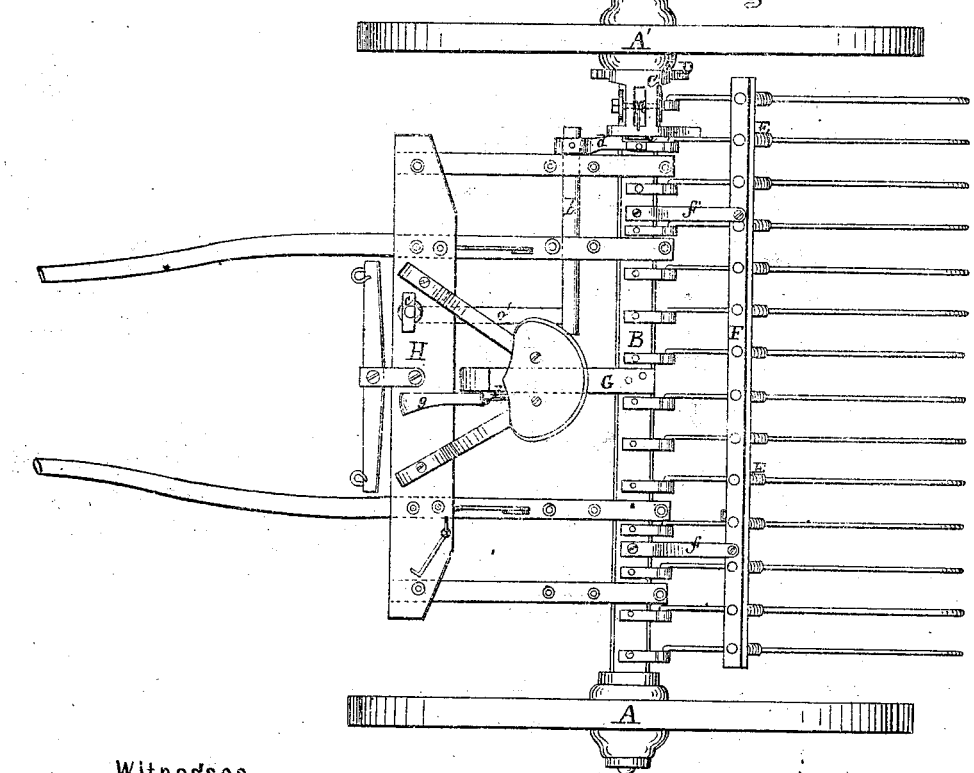
Witnesses. Inventor.

# UNITED STATES PATENT OFFICE.

S. R. NYE, OF BARRE, MASSACHUSETTS.

IMPROVEMENT IN HORSE-RAKES.

Specification forming part of Letters Patent No. 53,172, dated March 13, 1866.

*To all whom it may concern:*

Be it known that I, S. R. NYE, of Barre, in the county of Worcester and State of Massachusetts, have invented a new and useful Improvement in Horse Hay-Rakes; and I do hereby declare that the following is a full, clear, and exact description thereof, which will enable others skilled in the art to make and use the same, reference being had to the accompanying drawings, forming part of this specification, in which—

Figure 1 is a longitudinal section of a horse hay-rake with my improvements applied thereto, taken on the plane of the line $x\ x$, Fig. 2. Fig. 2 is a plan or top view of the same.

Similar letters of reference indicate like parts.

My invention consists, first, in the employment and arrangement of a dog mounted on the axle near the hub of one of the wheels, to be used in connection with a toothed wheel or plate secured to the hub of one of the wheels, the former being adjusted or thrown into gear by an arm carrying a friction-wheel, said arm being connected to a rock-shaft which is operated by a foot-lever near the driver's seat, by which arrangement the rake can be elevated by power derived directly from the wheel of the horse-rake.

It consists, second, in the employment of a spring-pawl for holding the axle-tree, which is the head, in such position as to cause the rake-teeth to bear upon the ground, but capable, should any material obstruction come in the way of the rake, of automatically releasing the said lever to permit the rake to rise bodily.

To enable others to understand my invention, I will proceed to describe it.

A A' represent the wheels of the rakes, and B the axle or shaft, which latter carries the tines $a\ a\ a$ of the rake. The said tines are hinged or pivoted to short arms or lugs arranged along upon one side of the axle-tree in such manner as to permit the said rake to be thrown bodily up and down at pleasure.

C is a dog or clutch, which is arranged on the axle near the hub of one of the wheels. Said dog carries on its under face, at its outer end, or that nearest the wheel, one or more stops or teeth, which are, when it is desired to elevate the rake, to be thrown into gear with a toothed wheel or plate, D, secured to the hub of the wheel. This throwing of the dog or clutch into gear causes the wheel, by its rotary motion, to elevate the rake. The said dog is pivoted at about its center to lugs secured to the axle in a manner to allow its ends a swinging or up-and-down motion. The mechanism used for operating the clutch consists of a rock-shaft, $b$, suitably supported by the frame of the rake-carriage, to one end of which rock-shaft there is attached a treadle and foot-lever, $c\ c'$, easily operated by the driver's foot, by which the rock-shaft is turned, and to the other end of said rock-shaft an arm, $d$, is attached, which carries at its end a friction-roller, $c$, which bears against the under face of the clutch or dog C, opposite its toothed end. Thus it will be seen that by depressing the foot-lever $c$ the rock-shaft $b$ will raise the arm $d$ and throw the roller $c$ up against the under face of the clutch or dog C, which necessarily elevates or throws upward that end of the said clutch end and forces or throws down the other, so that the teeth on the clutch will engage with those on the toothed plate on the hub of the axle, and thus the rake will be elevated, as before stated. The friction-roller $c$ performs an important feature, inasmuch as it permits a free movement up and down of the shaft or axle carrying the tines, as can be readily understood.

E E are a series of spiral springs, which are arranged to bear against the tines of the rake for keeping them depressed. The tines are secured against lateral play by being placed in long staples $e$, which are secured to a bar, F, running transversely across the rake, and secured to the axle by braces $f$. The springs are applied between the bar F and the tines, one end resting against the said bar and the other against the tine of the rake, as can be readily understood by reference particularly to Fig. 1. These springs bear, respectively, upon the tines of the rake to which they are attached, so that should any particular tine at any time be thrown up by any obstruction, such as a stone, the spring will immediately give, so as to allow the tine to rise, and so soon as the obstacle is passed over will cause it to regain its proper position, and they also serve as spring-braces for increasing the force with which the tines bear upon the ground.

G is an arm attached to the axle or rake-head B, and projecting forward and under the driver's seat. On its end a spring-pawl, $g$, is pivoted, which, when the rake is thrown down in proper position for raking, will rest upon a cross-piece, H, on the shafts and keep the rake down. The spring used in the present instance is a coil-spring, $h$, secured to the pawl $g$ and to the arm G in such manner that its tendency will be to cause the spring-pawl to bear against the cross-piece H, and thus keep the axle or shaft carrying the tines turned over, so that the tines bear upon the ground, and its strength is considerable, but yet not sufficient to prevent the rake, should it meet with any large obstruction, from releasing it, so as to be able to turn or swing upward to permit it to pass over such obstruction.

I am aware that rakes have been elevated by power derived from the wheels on which the rake is mounted, and I do not therefore claim any such principle; but

What I claim as new, and desire to secure by Letters Patent, is—

1. The dog or clutch C, in combination with the toothed plate D on the hub of the wheel and with the friction-roller $c$, substantially as shown and described.

2. The spring-pawl $g$, arranged and operating substantially as and for the purpose specified.

The above specification of my invention signed by me this 21st day of November, 1865.

SHERMAN R. NYE.

Witnesses:
M. M. LIVINGSTON,
C. L. TOPLIFF.